United States Patent
Imai et al.

(10) Patent No.: US 7,569,947 B2
(45) Date of Patent: Aug. 4, 2009

(54) INTERIOR MATERIAL STRUCTURE FOR VEHICLE

(75) Inventors: Takashi Imai, Okazaki (JP); Yuichi Ochiai, Toyota (JP); Takayuki Naito, Toyota (JP); Koutarou Hongou, Ichinomiya (JP); Tadanobu Ide, Toyota (JP)

(73) Assignees: Toyota Jidosha Kabushiki Kaisha, Toyota-Shi (JP); Toyota Boshoku Kabushiki Kaisha, Kariya-Shi (JP)

( * ) Notice: Subject to any disclaimer, the term of this patent is extended or adjusted under 35 U.S.C. 154(b) by 285 days.

(21) Appl. No.: 11/629,304

(22) PCT Filed: Jun. 28, 2005

(86) PCT No.: PCT/JP2005/012296

§ 371 (c)(1),
(2), (4) Date: Dec. 13, 2006

(87) PCT Pub. No.: WO2006/004077

PCT Pub. Date: Jan. 12, 2006

(65) Prior Publication Data

US 2007/0257502 A1 Nov. 8, 2007

(30) Foreign Application Priority Data

Jul. 2, 2004 (JP) ............................. 2004-197340

(51) Int. Cl.
*B60L 1/00* (2006.01)
(52) U.S. Cl. ........................................ 307/9.1
(58) Field of Classification Search ............... 307/9.1
See application file for complete search history.

(56) References Cited

U.S. PATENT DOCUMENTS 2,858,482 A 10/1958 Nutter
(Continued)

FOREIGN PATENT DOCUMENTS

DE 37 41 023 A1 6/1989
(Continued)

OTHER PUBLICATIONS

Nippon Sheet Glass Co. Ltd., "Window Glass Antenna for Automobile," Abstract of JP Publication No. 03-065803 (Mar. 20, 1991).
JP Office Action dated Oct. 24, 2008.

*Primary Examiner*—Robert L. DeBeradinis
(74) *Attorney, Agent, or Firm*—Finnegan, Henderson, Farabow, Garrett & Dunner, LLP (57) ABSTRACT

A disclosed interior material structure for a vehicle including an interior material made of a conductive portion and non-conductive portions covering the conductive portion includes a grounding unit (103) configured to electrically connect the conductive portion and a vehicle body. The grounding unit includes an interior material side terminal (201), a vehicle body side terminal (202), and a conductive wire (204). The interior material side terminal has a projecting member configured to bite into the interior material and then to be locked with the bite of the interior material in contact with the conductive portion. The vehicle body side terminal is configured to be attached to the vehicle body such that the vehicle body side terminal is electrically connected to the vehicle body. The conductive wire is configured to electrically connect the interior material side terminal and the vehicle body side terminal.

9 Claims, 5 Drawing Sheets

U.S. PATENT DOCUMENTS

| | | | | |
|---|---|---|---|---|
| 3,876,964 | A | * 4/1975 | Balaster et al. | 333/238 |
| 4,737,795 | A | * 4/1988 | Nagy et al. | 343/712 |
| 5,285,048 | A | 2/1994 | Nakase | |

FOREIGN PATENT DOCUMENTS

| | | | |
|---|---|---|---|
| DE | 102005059684 A1 * | 10/2007 | |
| GB | 2 322 839 A | 9/1998 | |
| JP | 60-43432 | 3/1985 | |
| JP | 63-158449 | 10/1988 | |
| JP | 2-68898 | 3/1990 | |
| JP | 7-100998 | 4/1995 | |
| JP | 2515158 | 4/1996 | |
| JP | 2001-334892 | 12/2001 | |
| JP | 2002-246101 | 8/2002 | |
| JP | 2002-281637 | 9/2002 | |
| JP | 2003-151652 | 5/2003 | |
| JP | 2003-260718 | 9/2003 | |
| JP | 2003-305789 | 10/2003 | |
| JP | 2004-23227 | 1/2004 | |
| JP | 2004-104918 | 4/2004 | |

* cited by examiner

INTERIOR MATERIAL STRUCTURE FOR VEHICLE

TECHNICAL FIELD

This invention relates generally to a conductive interior material structure for a vehicle, and more particularly to a conductive interior material structure for a vehicle in which induced noises in a conductive portion of the interior material are stably grounded.

BACKGROUND ART

Conventionally, it is common that an interior material for a vehicle includes an intermediate layer made of glass fibers as a reinforcing material. Recently, it has been proposed that the intermediate layer of the interior material structure be made of carbon fibers. See, for example, JP63-158449U, JP2003-260718A, or JP2003-305789A.

However, such a proposed interior material structure including the carbon fibers faces a new problem in that vehicle electric noises are distributed through a conductive portion of the interior material since the carbon fibers are conductive. In this context, the vehicle electric noises include, for example, ignition noise generated from an internal combustion engine, noises from electric motors, actuators, and the like for electric power steering, an air conditioner, electronic braking force control, and headlamp exposure area control, or any other electric noises in general which may be generated in the vehicle.

Figure 1A:
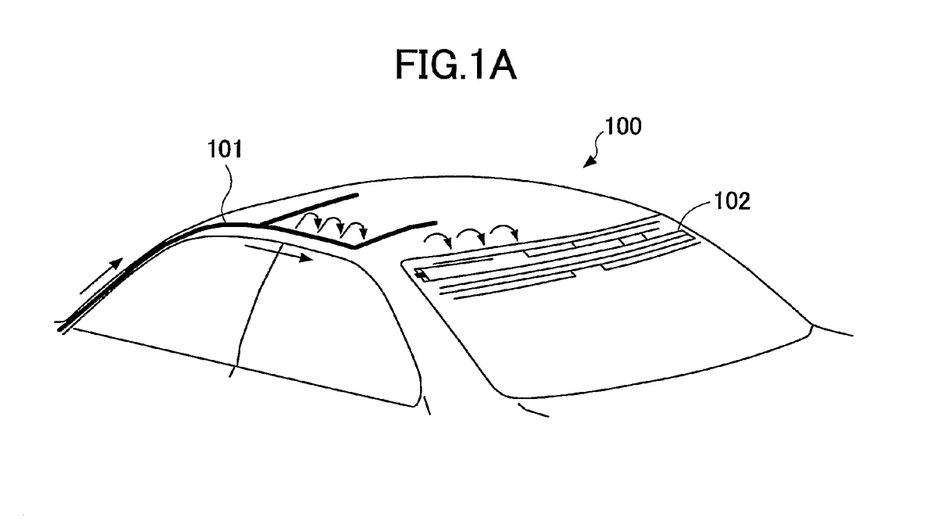
FIG. 1A is a schematic diagram showing the distribution of vehicle electric noises in a vehicle with a conventional interior material including the carbon fibers.

During such distribution of the vehicle electric noises, a glass antenna placed on a rear window becomes controversial. This is conceptually illustrated in FIG. 1A. When the vehicle electric noises distributed through a roof harness 101 and reaching a roof portion of a vehicle 100 induce and distribute electric noises in the conductive portion of the interior material, such induced electric noises may radiate to a glass antenna 102 at a rear end of the roof and affect the performance of the antenna.

This becomes more apparent as the interior material on the roof portion is provided closer to the rear window. According to the inventors' experimental knowledge, in terms of a frequency band, a glass antenna for AM radio is strongly affected, among others. However, it is rather difficult to say that other glass antennas such as ones for FM radio or TV are not affected at all.

DISCLOSURE OF THE INVENTION

To solve the above-mentioned problems, it is a main object of this invention to provide a conductive interior material structure for a vehicle in which induced noises in a conductive portion of the interior material are stably grounded.

One aspect of this invention to achieve the above object is an interior material structure for a vehicle, including an interior material made of a conductive portion and non-conductive portions covering the conductive portion, including a grounding unit configured to electrically connect the conductive portion and a vehicle body.

In the context of this aspect, the conductive portion consists of, for example, a CF/NF/PP mat layer, and the non-conductive portions consist of, for example, an indoor side non-conductive portion including a GCR knit layer, a poly-urethane foam (PUF) layer, a non-woven layer, and an adhesive film layer and an outboard non-conductive portion including a scrim layer and an "air dam+scrim" layer.

According to this aspect, noises induced in the conductive portion of the interior material are led to the vehicle body by the grounding unit, so that generation of noise radiation, which may affect the performance of the glass antenna, can be prevented.

In a preferred example of this aspect, in order to ensure a stable performance of grounding for the conductive portion of the interior material, the grounding unit includes an interior material side terminal, a vehicle body side terminal, and a conductive wire, the interior material side terminal having a projecting member configured to bite into the interior material and then to be locked with the bite of the interior material in contact with the conductive portion, the vehicle body side terminal being configured to be attached to the vehicle body such that the vehicle body side terminal is electrically connected to the vehicle body, the conductive wire being configured to electrically connect the interior material side terminal and the vehicle body side terminal.

According to this preferred example, the projecting member is to tear, perforate and bite into the interior material and to be locked with the bite in the interior material in contact with the conductive portion, so that the terminal of the grounding unit and the conductive portion of the interior material are certainly and stiffly made to be in contact, ensuring the stable electric connection between them.

In this preferred example, in terms of efficiency of installation, the projecting member preferably has a shape (especially the shape of its tip) to make the projecting member easy to be pushed into the interior material.

Also, in this preferred example, in order to attach the grounding unit to the interior material with sufficient contact pressure, the grounding unit preferably includes a plate-shaped member and a fastening unit, the fastening unit being configured to fasten the interior material side terminal, the interior material, and the plate-shaped member such that the interior material is held between the interior material side terminal and the plate-shaped member.

Also, in this preferred example, in order to make the interior material side terminal difficult to be pulled out or loose, the projecting member preferably includes a plurality of projections located around a through-hole for the fastening unit such that neighboring projections are set apart at an angle that is larger than a predetermined number of degrees in a circumferential direction.

Also, in this preferred example, in a case where curtain-type airbags are accommodated in the interior material, in order to avoid that the grounding unit prevents the airbags from expanding or that an element or elements of the grounding unit is pulled out from the interior material due to the expansion of the airbags, the grounding unit preferably includes a separable unit configured to break away a physical connection using the conductive wire between the interior material side terminal and the vehicle body side terminal when a tensile load greater than a predetermined load is applied to the conductive wire.

In this case, the separable unit may be a coupler configured to electrically and physically couple the conductive wire and the vehicle body side terminal, the coupling of which coupler is disconnected when a tensile load greater than the predetermined load is applied to the conductive wire.

Furthermore, in this preferred example, in order to prevent the direct current from passing through the interior material in the unlikely event that the conductive portion of the interior material and a power supply line (not shown) become short-circuited, a capacitor is preferably installed along the way of the conductive wire. The capacitor is preferably secured to the interior material in order not to be pulled out from the interior material when the airbags expand. The capacity of the capacitor may be determined based on frequency components of noises desired to be eliminated from the conductive wire.

BRIEF DESCRIPTION OF THE DRAWINGS

The foregoing and other objects, features, and advantages of the present invention will become apparent upon reading the following detailed description and upon reference to the drawing in which.

PREFERRED EMBODIMENTS FOR CARRYING OUT THE INVENTION

A preferred embodiment of the present invention is now described with reference to the appended drawings. Note that the basic structure, functions, and how to install in a vehicle, of the interior material for a vehicle are not described in detail in the following description because such matters are already known to a person skilled in the art.

Figure 1B:
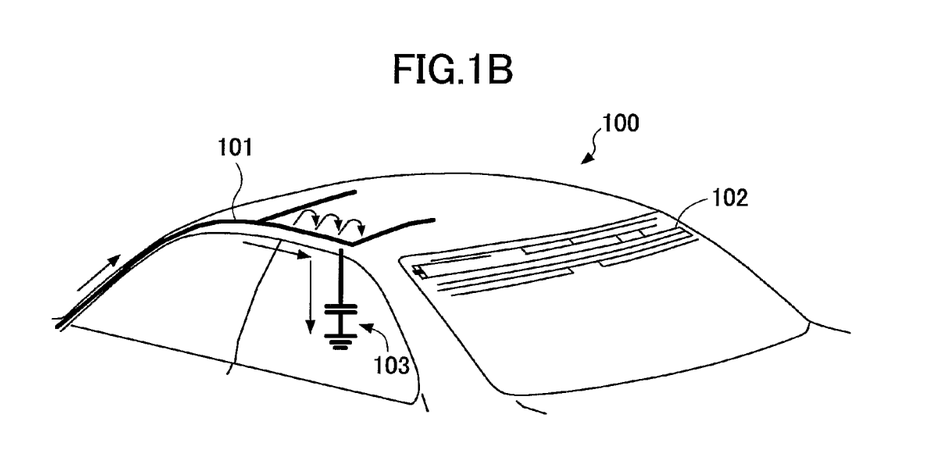
FIG. 1B is a schematic diagram showing the distribution of vehicle electric noises in a vehicle with an interior material according to the present invention.

FIG. 1B schematically shows a concept of a grounding structure according to an embodiment of the present invention. The grounding structure 103 of this embodiment connects electrically the conductive portion of the interior material and a vehicle body (a grounded body) via a capacitor so that noises induced and distributed in the conductive portion of the interior material are grounded at the vehicle body rather than radiating to a glass antenna.

Figure 2:
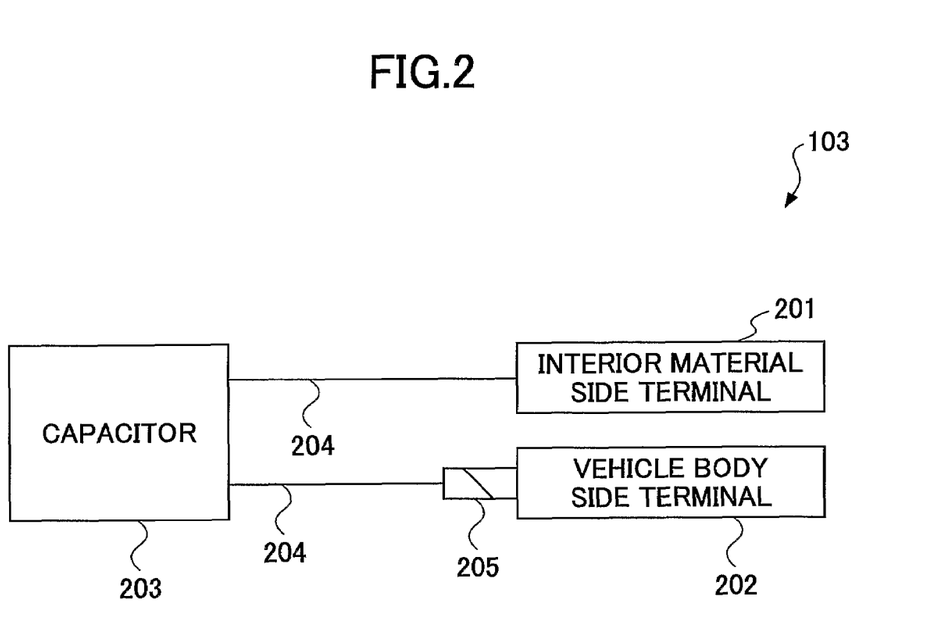
FIG. 2 is a schematic view showing a configuration of a grounding structure according to an embodiment of the present invention.

FIG. 2 schematically shows a configuration of the grounding structure 103 of this embodiment. As shown, the grounding structure 103 includes an interior material side terminal 201 and a vehicle body side terminal 202. The interior material side terminal 201 is coupled with the interior material such that the interior material side terminal 201 is electrically connected with the conductive portion of the interior material. The vehicle body side terminal 202 is coupled with the vehicle body such that the vehicle body side terminal 202 is electrically connected with the vehicle body (the grounded body).

In this embodiment, the interior material side terminal 201 is electrically and physically connected to the vehicle body side terminal 202 via a capacitor 203 with conducting wires 204. Since any connecting techniques known to the persons skilled in the art may be employed for the connections between the conducting wire 204 and each of the interior material side terminal 201, the vehicle body side terminal 202, and the capacitor 203, details are not described or shown. Similarly, since any connecting techniques known to persons skilled in the art may be employed for the connection between the vehicle body side terminal 202 and the vehicle body, details are not described or shown.

In this embodiment, no direct current can pass through the grounding structure 103 due to the capacitor 203 provided along the way of the conducting wires 204 of the grounding structure 103. Accordingly, in the unlikely event that the conductive portion of the interior material and a power supply line (not shown) become short-circuited, no heat resulting from the direct current is generated at the conductive portion of the interior material because no direct current passes through the grounding structure 103.

On the other hand, generally speaking, a capacitor has a frequency band that easily passes through it and a frequency band for which it is difficult to pass through, depending on its capacity. In this embodiment, using this characteristic, the capacity of the capacitor 203 is determined based on a frequency band of noises that one desires to eliminate from the conductive portion of the interior material such that the undesired frequency band of the noises is a frequency band for which it is easy to pass through the capacitor 203. This leads to efficient elimination of the undesired noises.

In this embodiment, a separable structure 205 is provided on a coupling between the vehicle body side terminal 202 and the conductive wire 204. The separable structure 205 of this embodiment acts as a coupler for electrically and physically coupling the vehicle body side terminal 202 and the conductive wire 204 in a normal condition, and as a pair of separating parts for physically separating the vehicle body side terminal 202 from the conductive wire 204 when a predetermined tensile load (e.g. a load being no less than 100 N) is applied to the conductive wire 204.

The grounding structure 103 can be installed near curtain-type airbags accommodated into the interior material such as above the C-pillar. In this context, the curtain-type airbag is an airbag, which is accommodated into the bottom of the roof interior material in a normal condition, and which is expanded downward to an indoor space from a clearance made between a part of the interior material and the vehicle body by breaking away the part of the interior material from the vehicle body when expanding.

In a case where the grounding structure 103 with such a separable structure 205 is placed near the curtain-type airbag, when the part of the interior material is physically broken away from the vehicle body due to the expansion of the airbag, the interior material side terminal 201 is physically separated from the vehicle body side terminal 202 by the separable structure 205. Accordingly, the grounding structure 103 preventing the curtain-type airbag from expanding, or the grounding structure 103 being disconnected from the vehicle body and falling down in the indoor space when the airbags expand, can be avoided.

In an alternative embodiment, the separable structure 205 may be provided anywhere along the way of the conducting wires 204, in terms of its function for physically separating the terminals. However, it is preferred, as in this embodiment, that the separable structure 205 be a detachable coupler for coupling the conductive wire 204 and one of the terminals, in terms of the number of parts and the complexity of the structure.

It is understood by the persons skilled in the art that, in a case where the separable structure 205 is a detachable coupler for coupling the conducting wire 204 and the vehicle body side terminal 202 as in this embodiment, the capacitor 203 is attached to the interior material since the capacitor 203 needs to separate together with the interior material side terminal 201 from the vehicle body side terminal 202 when separating. On the other hand, in a case where the separable structure 205 is provided between the capacitor 203 and the interior material side terminal 201, unlike with this embodiment, the capacitor 203 is attached to the vehicle body. In securing the capacitor 203, it is preferred that capacitor 203 be appropriately placed in a concave portion of the vehicle body in order to avoid the convexity of the capacitor 203 being apparent through the interior material from the indoor space.

Figure 3A:
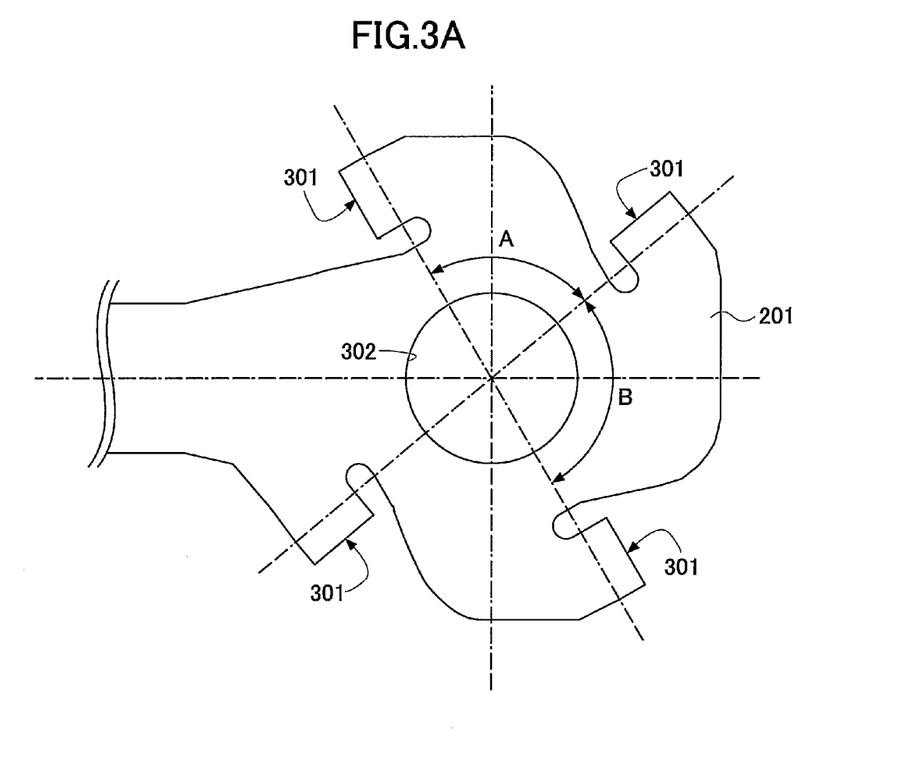
FIG. 3A is a top view of an interior material side terminal of the grounding structure according to an embodiment of the present invention.
Figure 3B:
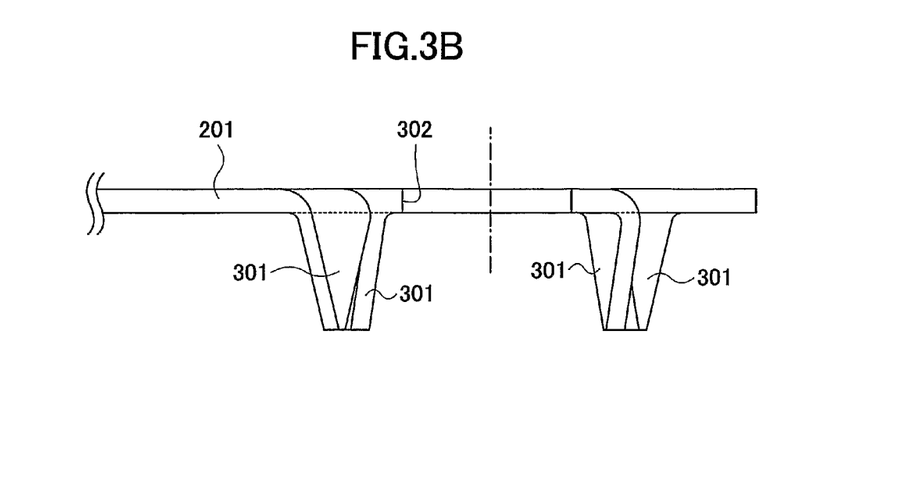
FIG. 3B is a side view of the interior material side terminal of the grounding structure according to an embodiment of the present invention.

With reference to FIG. 3, a shape of the interior material side terminal 201 is now described in detail. FIGS. 3A and 3B are a top view and a side view, respectively, showing an example of a shape at the tip of the interior material side terminal 201.

By the way, when the conductive interior material including the carbon fiber layers is grounded to the vehicle body, it is not sufficient to screw the interior material onto the vehicle body. In such interior material, both front and back sides of the conductive section of layers are generally covered by non-conductive sections of layers, i.e. the conductive section is sandwiched between two non-conductive sections. If a bolt and nut fastening is used, the electric current from the conductive portion of the interior material to the vehicle body passes only through the bolt and surface contact between the conductive portion of the interior material and the vehicle body cannot be achieved. However, since the interior material generally has low rigidity and is easy to deform, such threaded contact between the conductive portion of the interior material and the screws may easily become non-contacting due to, for example, looseness of the screws, scattering or deformation of the interior material when fastening, swiveling of the interior material after fastening, and the like.

Thus, in this embodiment, the interior material side terminal 201 has four projections (tabs) 301. Also, the interior material side terminal 201 has a through-hole 302 in an approximate center of the terminal for letting a fastening unit (described later) through it. The projections 301 are projected in an approximate perpendicular direction from a plane of the interior material side terminal 201 by, for example, bending some portions of the terminal 201. Tips of the projections 301 are shaped so as to easily bite into the interior material. Installation of the interior material side terminal 201 to the interior material becomes more efficient, as the projections 301 are shaped to easily bite into the interior material.

In this embodiment, the number of the projections 301 is, by way of example, four. It is understood by persons skilled in the art that more projections 301 may make the fastening more difficult to come loose. However, more projections 301 may might the manufacturing process more complicated. Therefore, in an alternative embodiment, the interior material side terminal 201 with the projections 301 whose number is not four, but is determined in view of the manufacturing process may be employed.

Furthermore, in this embodiment, facing directions of circumferential surfaces of the projections 301 are set apart at a predetermined angle. FIG. 3 shows an example where four projections 301 are located around the through-hole 302, each of which is at 80 degrees (A) or 100 degrees (B) interval from the neighbor. In other words, FIG. 3 shows a case where neighboring projections 301 are set apart at an angle that is greater than 80 degrees in a circumferential direction. Locating the projections 301 in such a manner, the interior material side terminal 201 coming loose or swiveling relative to the interior material after fastening is avoided, so that stiff fastening can be maintained.

Figure 4:
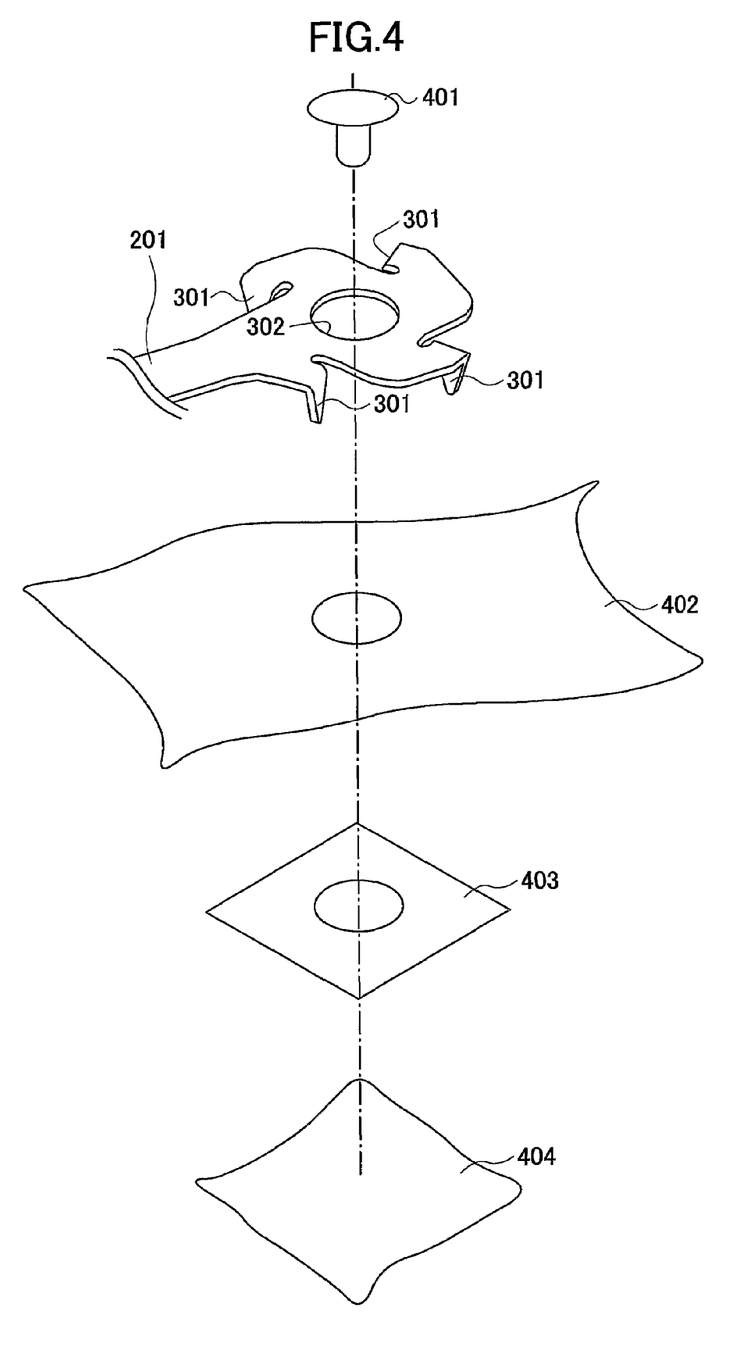
FIG. 4 is a diagram of installation of the interior material side terminal of the grounding structure according to an embodiment of the present invention.

With reference to FIG. 4, fastening the interior material side terminal 201 of this embodiment to the interior material is now described in detail. FIG. 4 shows installation of the interior material side terminal 201 onto the interior material. In this embodiment, by way of example, a pull stem type blind rivet 401 is used to fasten the interior material side terminal 201 to the interior material.

As shown in FIG. 4, the interior material side terminal 201 is pushed into the interior material 402 such that the projections 301 bite into the interior material 402. A plate-shaped washer 403 is provided on the other side of the interior material 402. Through-holes like the through-hole 302 of the interior material side terminal 201 for letting the rivet through them are formed in the interior material 402 and the washer 403. Under a condition where the projections 301 of the interior material side terminal 201 are biting into the interior material, the rivet 401 is let through the interior material side terminal 201, the interior material 402, and the washer 403, and the fastening of the rivet 401 is accomplished by a pulling process known to the persons skilled in the art.

In this embodiment, by using the pull stem type blind rivet, semi-permanent fastening can be easily achieved at low cost. Furthermore, by providing the washer 403, the deformation of the interior material 402 having low rigidity can be made stable, and contact pressure required to ensure the grounding capability can be maintained.

After fastening, the caulked tip of the stem of the rivet 401 and the washer 403 are covered with a non-woven seal 404 for insulation.

Note that the thicknesses of the interior material 402, the washer 403, and the non-woven seal 404 are not shown in FIG. 4, for the sake of simplicity.

Figure 5:
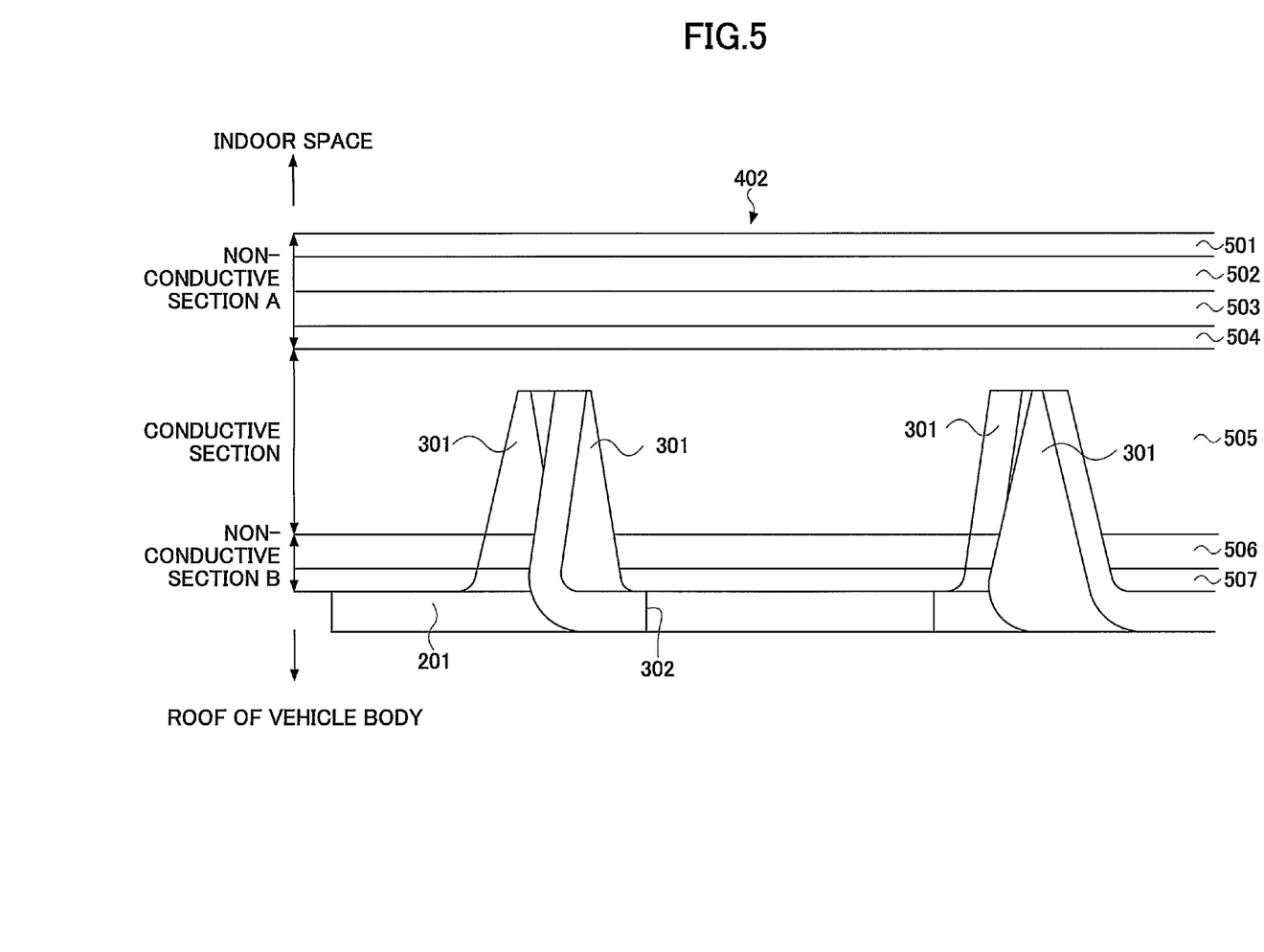
FIG. 5 is a diagram showing the interior material side terminal of the grounding structure according to an embodiment of the present invention when projections of the interior material side terminal are pushed into the interior material.

FIG. 5 shows the projections 301 of the interior material side terminal 201 and the interior material 402 when the projections 301 are biting into the interior material 402. In this embodiment, by way of example, the interior material 402 consists of seven layers. A non-conductive section of layers A consists of a GCR knit layer 501, a PUF layer 502, a non-woven layer 503, and an adhesive film layer 504. A conductive section consists of a CF/NF/PP mat layer 505. Another non-conductive section of layers B consists of a scrim layer 506 and an "air dam+scrim" layer 507.

In this embodiment, the projections 301 are pushed into the interior material 402 from a side of the non-conductive section B. The projections 301 burst through the non-conductive section B and then reach the conductive section. In FIG. 5, relative dimensions of lengths in a vertical direction of the projections 301 are illustrative only. The vertical lengths of the projections 301 are longer than the thickness of the non-conductive section B, and also need to be long enough to ensure a stable electric connection between the projections 301 and the conductive section when the projections 301 are pushed into the interior material 402. In terms of ensuring the conductivity, the projections 301 may burst through the conductive section and the tips of the projections 301 may reach to the non-conductive section A. However, in such a case, it is necessary to prevent the tips of the projections 301 from bursting through the non-conductive section A and then making contact with the washer 403 (FIG. 4) in consideration of the deformation (reduction in the vertical direction) of the interior material 402 resulting from pushing the interior material side terminal 201 into the interior material 402.

Thus, according to this embodiment, since the interior material side terminal of the grounding structure for connecting the conductive portion of the interior material and the vehicle body has projections (tabs) biting into the interior material, a grounding structure is provided that has low rigidity and can be stably grounded to an interior material including the conductive portion inside.

By the way, in the above embodiment, by way of example, an illustrative case is described where only one grounding structure 103 is installed on one vehicle. However, the present invention is not limited to this and a plurality of grounding structures 103 may be installed on one vehicle.

Also, in the above embodiment, by way of example, an illustrative case is mainly described where the grounding structure 103 is installed on a roof portion of the interior material. However, the present invention is not limited to this and the grounding structure 103 may be installed on any portion of the interior material, including a package tray, seats, door trim, an instrument panel, or the like.

The present invention is applicable to any vehicle employing an interior material including a conductive portion. The present invention does not depend on visual design, weight, size, or performance of driving the vehicle on which the grounding structure of the present invention is employed.

The contents of Japanese Patent Application No. JP2004-197340 filed on Jul. 2, 2004 including the specification, drawings, and abstract are incorporated herein by reference in its entirety.

The invention claimed is:

1. An interior material structure for a vehicle, comprising:
an interior material made of a conductive portion and non-conductive portions covering the conductive portion; and
a grounding unit configured to electrically connect the conductive portion and a vehicle body, wherein:
the grounding unit comprises an interior material side terminal, a vehicle body side terminal, and a conductive wire, the interior material side terminal having a projecting member configured to bite into the interior material and then to be locked with the bite of the interior material in contact with the conductive portion, the vehicle body side terminal configured to be attached to the vehicle body such that the vehicle body side terminal is electrically connected to the vehicle body, the conductive wire being configured to electrically connect the interior material side terminal and the vehicle body side terminal.

2. The interior material structure of claim 1, wherein: the grounding unit further comprises a plate-shaped member and a fastening unit, the fastening unit being configured to fasten the interior material side terminal, the interior material, and the plate-shaped member such that the interior material is held between the interior material side terminal and the plate-shaped member.

3. The interior material structure of claim 1, wherein: the projecting member includes a plurality of projections located around a through-hole for the fastening unit such that neighboring projections are set apart at an angle that is greater than a predetermined number of degrees in a circumferential direction.

4. The interior material structure of claim 1, wherein: the grounding unit further comprises a separable unit configured to breakaway a physical connection using the conductive wire between the interior material side terminal and the vehicle body side terminal when a tensile load greater than a predetermined load is applied to the conductive wire.

5. The interior material structure of claim 4, wherein: the separable unit is a coupler configured to electrically and physically couple the conductive wire and the vehicle body side terminal, and the coupling of which coupler is disconnected when the tensile load greater than the predetermined load is applied to the conductive wire.

6. The interior material structure of claim 1, further comprising: a capacitor installed along the way of the conductive wire.

7. The interior material structure of claim 6, wherein: the capacitor is secured to the interior material.

8. The interior material structure of claim 6, wherein: the capacity of the capacitor is determined based on frequency components of noises desired to be eliminated from the conductive wire.

9. An interior material structure for a vehicle, comprising:
an interior material made of a conductive portion and non-conductive portions covering the conductive portion; and
a grounding unit configured to electrically connect the conductive portion and a vehicle body, wherein:
the grounding unit comprises an interior material side terminal, a vehicle body side terminal, a conductive wire, the interior material side terminal having a projecting member configured to bite into the interior material and then to be locked with the bite of the interior material in contact with the conductive portion, the vehicle body side terminal configured to be attached to the vehicle body such that the vehicle body side terminal is electrically connected to the vehicle body, the conductive wire being configured to electrically connect the interior material side terminal and the vehicle body side terminal, and
a separable unit configured to break away, using the conductive wire, a physical connection between the interior material side terminal and the vehicle body side terminal when a tensile load greater than a predetermined load is applied to the conductive wire.

* * * * *